Figure 1:
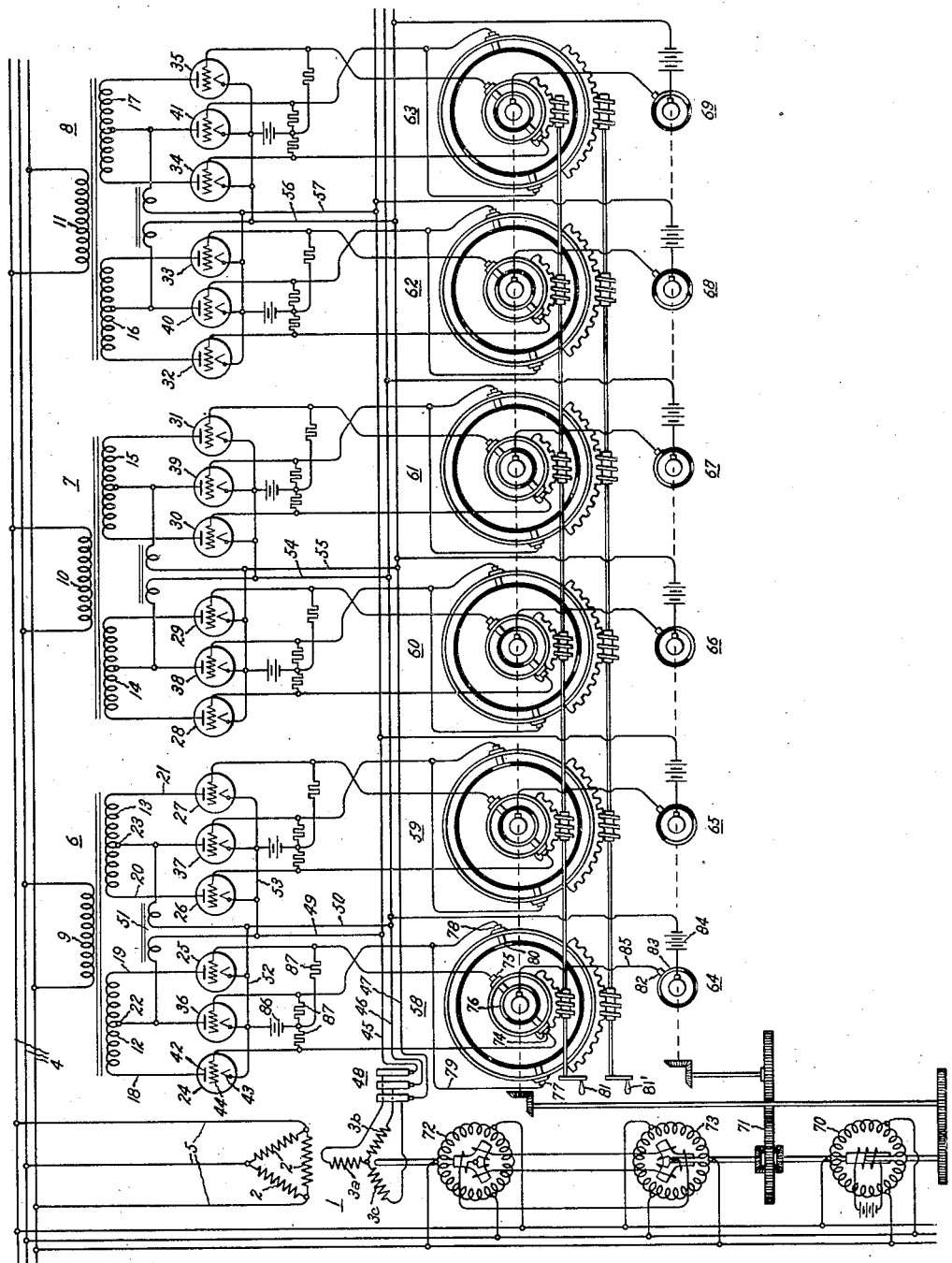

April 13, 1937.  B. D. BEDFORD  2,077,206
ALTERNATING CURRENT MOTOR SYSTEM
Filed June 23, 1936  2 Sheets-Sheet 1

Inventor:
Burnice D. Bedford,
by Harry E. Dunham
His Attorney.

April 13, 1937.    B. D. BEDFORD    2,077,206
ALTERNATING CURRENT MOTOR SYSTEM
Filed June 23, 1936    2 Sheets-Sheet 2

Inventor:
Burnice D. Bedford,
by Harry E. Dunham
His Attorney.

Patented Apr. 13, 1937

2,077,206

UNITED STATES PATENT OFFICE 2,077,206

ALTERNATING CURRENT MOTOR SYSTEM

Burnice D. Bedford, Schenectady, N. Y., assignor to General Electric Company, a corporation of New York Application June 23, 1936, Serial No. 86,792

REISSUED

12 Claims. (Cl. 172—274)

My invention relates to alternating current motor systems and more particularly to electric valve translating systems for energizing an alternating current motor of the induction type.

Heretofore there have been devised several electric valve systems for energizing alternating current motors from alternating current circuits of fixed or variable frequency. These systems have been found to be highly desirable in view of the great flexibility in control and operation. In such systems, where dynamo-electric machines of the induction type have been energized from alternating current circuits through electric valve translating apparatus, it has been found that under certain operating conditions the power factor of the load imposed on the supply circuits is unsatisfactory. It has, therefore, become evident that in order to maintain a reasonable power factor of the load current consumed from the alternating current supply circuits, the electric valve translating circuits must be arranged and constructed so that the desired betterment of power factor conditions is obtained without sacrificing the desired flexibility of operation and control.

It is an object of my invention to provide a new and improved alternating current motor system.

It is another object of my invention to provide a new electric valve translating circuit for controlling an alternating current motor of the induction type.

It is a further object of my invention to provide an electric valve translating circuit for energizing a dynamo-electric machine of the induction type from an alternating current circuit, whereby the speed of the dynamo-electric machine may be controlled from standstill to double synchronous speed and above.

It is a still further object of my invention to provide an electric valve translating circuit for energizing an alternating current motor of the induction type from an alternating current circuit from standstill to double synchronous speed and which provides means for controlling the power factor of the load imposed on the alternating current circuit.

In accordance with the illustrated embodiment of my invention, I provide an electric valve translating circuit for controlling an operating condition, such as the speed, of a dynamo-electric machine of the induction type. A stator or inducing winding of the dynamo-electric machine is connected to an alternating current circuit and the induced or rotor winding is connected to the alternating current circuit through electric translating apparatus including a network of windings having terminal connections and connections electrically intermediate the terminal connections. Electric valve means are associated with the terminal connections and the intermediate connections to transmit energy between the alternating current circuit and the rotor winding of the dynamo-electric machine. The electric valve means are arranged to control the speed of the dynamo-electric machine from standstill to double synchronous speed and above by controlling the effective or resultant impedance of the rotor circuit. The dynamo-electric machine is controlled from standstill to synchronous speed by causing the electric valve means to transmit energy from the rotor winding to the alternating current circuit. Within the range of speeds from synchronous speed to double synchronous speed, the electric valve means is controlled so that the electric valve means operates to transmit energy from the alternating current circuit to the rotor winding. The electric valve means associated with the intermediate connections are arranged to control the relative voltages of the alternating current circuit and the rotor winding. The electric valve means associated with the intermediate members not only serve as a means for controlling the power factor of the current when energy is being supplied from the network to the alternating current circuit, but also serve as a means for controlling the power factor of the current when energy is being supplied by the alternating current circuit to the network. In order to control the conductivity of the electric valve means in accordance with the frequency of the potential of the rotor winding, a synchronously driven commutator and a commutator driven at slip frequency are provided to energize control members of the electric valve means. To provide means for controlling the phase of the potentials impressed on the control members of the electric valve means the commutators are arranged to be mechanically adjustable to effect this result.

Figure 2:
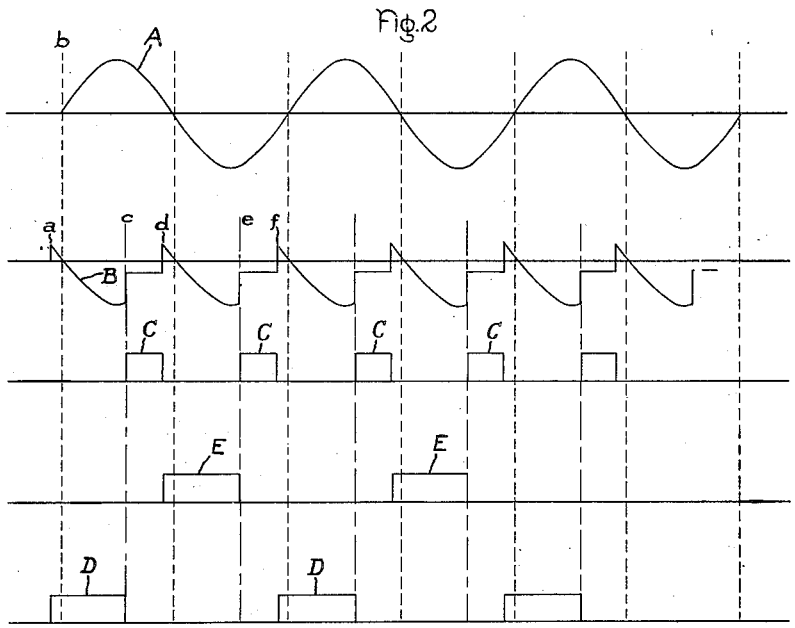
Figure 3:
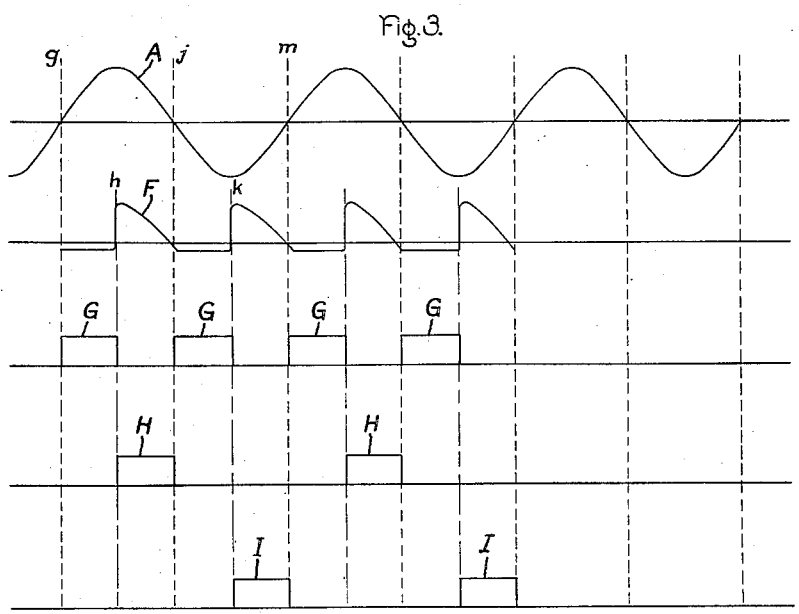

For a better understanding of my invention, reference may be had to the following description taken in connection with the accompanying drawings and its scope will be pointed out in the appended claims. Fig. 1 of the accompanying drawings diagrammatically represents an embodiment of my invention as applied to an electric valve translating circuit for controlling a dynamo-electric machine of the induction type; and Figures 2 and 3 represent certain operating characteristics thereof.

Referring to Fig. 1 of the accompanying drawings, a dynamo-electric machine 1 having an inducing or stator winding 2 and induced or rotor phase windings 3a, 3b and 3c is energized from an alternating current circuit 4. The stator winding 2 is connected to the alternating current circuit 4 through conductors 5 and the rotor phase windings 3a, 3b and 3c are energized from the alternating current circuit 4 through electric valve translating apparatus which controls the magnitude and direction of energy transfer between the alternating current circuit and the rotor phase windings. The electric translating apparatus includes a plurality of electrical networks 6, 7 and 8 which may be provided by utilizing transformers having primary windings 9, 10 and 11, and secondary windings 12 and 13, 14 and 15, and 16 and 17, respectively. The electrical networks 6, 7 and 8 and the associated electric valve means are of the type described and broadly claimed in U. S. Patent No. 2,004,778, granted June 11, 1935, on my application and assigned to the assignee of the present application. Considering in particular the electrical network 6 provided by the transformer included therein, each of the secondary windings 12 and 13 of this transformer is provided with terminal connections 18 and 19, 20 and 21, respectively, and connections 22 and 23 which are electrically intermediate the terminal connections 18 and 19, and 20 and 21, respectively. Electric valve means, preferably of the type employing ionizable mediums such as gases or vapors, are associated with the terminal connections and the intermediate connections of the secondary windings of networks 6, 7 and 8. For the purpose of explaining my invention, I have chosen to represent these electric valve means as of the type employing single anodes, although it should be understood that electric valve means of the type employing a plurality of anodes enclosed in a single receptacle may be used if desired. Electric valves 24—35 are associated with the terminal connections of the secondary windings of the associated transformers of the networks 6, 7 and 8, and electric valves 36—41 are associated with the intermediate connections of the secondary windings of the transformers of the networks 6, 7 and 8. Each of the electric valves 24—41 is provided with an anode 42, a cathode 43 and a control member 44.

Although I have diagrammatically shown my invention as embodying a plurality of single phase networks and associated electric valve means, it is to be noted that I may employ a polyphase network and associated electric valve means arranged to function in a similar manner.

The terminals of the rotor phase windings 3a, 3b and 3c are connected to conductors 45, 46 and 47 through a suitable slip ring assembly 48. Electric valves 24—27, and 36 and 37 are connected to rotor phase windings 3a and 3b through the conductors 45 and 46, conductors 49 and 50 and through windings of an inductive device 51 which is employed as a smoothing reactor. The windings of the inductive device 51 are connected to the intermediate connections 22 and 23 of secondary windings 12 and 13 and are also connected to the anodes of electric valves 36 and 37. The cathodes of electric valves 24, 25 and 36 are connected together and are connected to conductor 50 through a conductor 52, and the cathodes of electric valves 26, 27 and 37 are connected to conductor 49 through a conductor 53. In like manner, electric valves 28—31 and 38 and 39 are connected to rotor phase windings 3b and 3c through conductors 54 and 55, and the conductors 46 and 47; and electric valves 32—35, and 40 and 41 are connected to energize rotor phase windings 3c and 3a through conductors 56 and 57 and the conductors 47 and 45.

To control electric valves 24—41, inclusive, I employ a plurality of commutators 58—69, inclusive. The commutators 58—63, inclusive, are synchronously driven with respect to the potential of the alternating current circuit 4 by means of a synchronous motor 70, and commutators 64—69 are driven at a speed corresponding to the slip frequency of the dynamo-electric machine 1 by means of the differential gearing 71 and a synchronous motion transmitting means 72 and 73. For the purpose of explaining my invention, I have shown my invention as applied to an arrangement suitable for driving the gearing 71 and commutators 64—69 for applications where it is not desirable to drive the commutators 64—69 by direct connection to the dynamo-electric machine 1.

Each of the commutators 58—63 is associated with a different group of electric valves. For example, commutator 58 controls the conductivity of electric valves 24, 25 and 36. To facilitate the description of the commutating devices 58—63, the commutator 58 will be considered in detail. Brushes 74 and 75 cooperate with the conducting segments 76 to impress a suitable potential on control members 44 of electric valves 24 and 25 respectively. The segment 76 is arranged to render electric valves 24 and 25 conductive alternately. Brushes 77 and 78, being electrically connected through a conductor 79, cooperate with conducting segment 80 to render electric valve 36 conductive twice during each cycle of alternating potential. Each of the commutators 58—63 is provided with suitable independent means, such as mechanical angular positioning arrangements 81 and 81', to adjust the time at which the associated electric valves are rendered conductive relative to the alternating potential of circuit 4.

To control the electric valves 24—41 in accordance with an operating condition, such as the speed of the dynamo-electric machine 1, I employ the commutators 64—69 which are rotated at a speed corresponding to the slip frequency and which are associated with commutators 58—63, respectively. For example, brush 82 and conducting segment 83 cooperate to supply a properly timed potential from a suitable source such as a battery 84 to the commutator 58 through a conductor 85. A battery 86 is associated with the control member circuits for the electric vales 24, 25 and 36 to impress on the control members 44 a negative biasing potential through current limiting resistances 87.

The general principles of operation of the embodiment of my invention diagrammatically shown in Fig. 1 of the drawings may be best explained by considering the operation of the dynamo-electric machine 1 when the speed of this machine is being controlled by means of the electric valve translating apparatus. The electrical networks 6, 7 and 8 and the associated electric valves means operate individually as single phase electric valve converters to transmit energy between the rotor phase windings of the dynamo-electric machine 1 and the alternating current circuit 4. For example, the electrical network 6 and the associated electric valves 24—27 and 36 and 37 operate to transmit energy between alternating current circuit 4 and rotor phase windings 3a and 3b of dynamo-electric machine 1. By means of this electric valve converter, energy cannot only be transmitted from the rotor phase windings to the alternating current circuit 4 but energy may also be transmitted from the alternating current circuit 4 to the rotor phase windings. To control the speed of the dynamo-electric machine 1 between standstill and synchronous speed, the electrical network 6 and the associated electric valves operate to impress in the rotor circuit of the dynamo-electric machine 1 voltages in opposition to the induced voltages, in this manner serving to control the net or resultant impedance of the rotor circuit winding. Under such conditions of operation, the electrical network 6 and the associated electric valve means are operating to transmit energy from the rotor phase windings to the alternating current circuit 4. In order to control the speed of the dynamo-electric machine 1 from synchronous speed to double synchronous speed, the electrical networks and the associated electric valve means operate to impress in the rotor circuits voltages which tend to assist the induced voltages. Under such conditions of operation, the electric valve means are operating to transmit energy from the alternating current circuit 4 to the rotor phase windings.

Let it be assumed that it is desired to control the speed of the dynamo-electric machine 1 from standstill to synchronous speed. For the purpose of facilitating the description of the operation of the electric valve translating circuit, the electrical network 6 and the associated electric valve means will be considered in particular. It is well understood by those skilled in the art that in dynamo-electric machines of the induction type, the speed of these machines may be controlled by controlling the effective or net impedance of the rotor circuit. Therefore, in order to impress in the rotor circuit suitable voltages to effect the desired increase in effective impedance, the potentials impressed on the control members 44 of electric valves 24—27 are adjusted by means of the angular positioning means 81 so that the potentials impressed on the control members 44 are in substantial phase opposition to the potentials impressed between the anodes and cathodes of these electric valves. For practical purposes, however, it is necessary to maintain a certain commutating angle and the potentials impressed on the control members 44 are retarded approximately 170 electrical degrees. Inasmuch as the electric valves 36 and 37 are rendered conductive twice during each cycle of alternating potential, the potentials impressed on the control members of these electric valves are adjusted by means of the angular positioning means 81' so that these valves are rendered conductive at approximately the zero potential points during the cycle of alternating potential. With the potentials impressed on the control members of the various associated electric valves adjusted in this manner, it will be understood that the electrical network 6 and the associated electric valves 24—27 and 36 and 37 will impress in the rotor circuit, including phase windings 3a and 3b, the maximum potential which is in opposition to the voltage which is induced in these phase windings by means of the stator or inducing winding 2 of dynamo-electric machine 1. Since the associated commutator 64 is driven at a speed corresponding to the slip frequency through the differential gearing 71, it will be understood that the frequency of the opposing potential impressed in the rotor circuit by the electrical network 6 and the associated electric valves will have a frequency equal to the slip frequency.

To start the dynamo-electric machine, the potentials impressed on the controlled members 44 of electric valves 36 and 37 are advanced in phase by means of the angular positioning means 81' and associated brushes 77 and 78 so that the opposing voltage impressed in the rotor circuit is decreased in magnitude, effecting thereby an increase in the rotor circuit current. During this acceleration period it should be understood that by means of the commutator 64 the frequency of the opposing potential impressed in the rotor circuit is always maintained at a value equal to the frequency of the potential induced in the rotor phase windings. By still further advancing the phase of the potentials impressed on the control members of electric valves 36 and 37, the speed of the dynamo-electric machine 1 may be increased to substantially synchronous speed at which speed the phase of the potentials impressed on the electric valves 36 and 37 has been advanced to a position substantially 180 electrical degrees in advance of the original phase position.

The operation of the embodiment of my invention shown in Fig. 1 may be better understood by considering the operating characteristics represented in Fig. 2 where curve A represents the voltage of one phase of the alternating current circuit 4, for example the voltage impressed on the network 6; curve B represents the voltage impressed by the network 6 and electric valves 24, 25 and 36 on the rotor circuit including windings 3a and 3b; curve C represents the current conducted by electric valve 36; curve D represents the current conducted by electric valve 24, and curve E represents the current conducted by electric valve 25. It is to be understood that electric networks 6, 7 and 8 impress voltages on the rotor windings 3a, 3b and 3c, each of these networks supplying the voltage for one phase of the three phase system of voltages. The curve B represents the opposing voltage impressed on rotor windings 3a and 3b during a half cycle of rotor voltage of predetermined polarity, and it is to be understood that during the half cycles of opposite polarity electric valves 26, 27 and 37 will function to impress an opposing voltage of opposite polarity on windings 3a and 3b. In other words, during the positive half cycles of rotor voltage electric valves 24, 25 and 36 will supply the negative voltage represented by curve B and during negative half cycles of rotor voltage electric valves 26, 27 and 37 will supply a positive voltage of a wave form similar to that represented by curve B.

As stated above, when the induction motor 1 is operating below synchronous speed the electric networks 6, 7 and 8 impress on the rotor circuit of the induction motor voltages which tend to oppose the flow of current due to the induced voltages in the rotor winding. When the electric valves 24 and 25 are rendered conductive at times a and d, respectively, and the electric valve 36 is rendered conductive at time d, electric valve 36 will be substantially non-conducting and the voltage impressed on the rotor windings 3a and 3b will be maximum. By advancing the phase of the control potential impressed on the control member of electric valve 36 to the position corresponding to line c, it will be understood that the voltage impressed on windings 3a and 3b will be decreased and the electric valve 36 will conduct current during the intervals c—d and e—f. Electric valve 36 will conduct current twice during each cycle of alternating potential by virtue of the fact that the counter-electromotive force of the winding 12 is in a direction to effect commutation of the current from electric valve 24 to electric valve 36 at the time c when electric valve 26 is rendered conductive. Furthermore, the counter-electromotive force of the winding 12 is in a direction to effect commutation of the current from electric valve 25 to electric valve 36 at a time corresponding to the line e. In this manner, as the phase of the control potential impressed on control members of electric valves 36—41, inclusive, is advanced, the voltages impressed on rotor windings 3a, 3b and 3c by networks 6, 7 and 8 will be decreased, effecting thereby an increase in the speed of the induction motor 1.

By virtue of the electric valves 36 and 37 and the manner in which these electric valves have been controlled, the power factor of the current supplied to the alternating current circuit 4 has been maintained at a larger value than would have been possible by use of the prior art arrangements, inasmuch as the electric valves 36 and 37 transmit current to effect a more nearly phase coincident relation with the voltage and the current of the alternating current circuit 4.

In order to control the speed of the dynamo-electric machine 1 from synchronous speed to double synchronous speed, it is necessary to control the electrical networks 6, 7 and 8 and the associated electric valve means so that energy is transmitted from the alternating current circuit 4 to the rotor phase windings 3a, 3b and 3c. Considering in particular the electrical network 6 and the associated electric valve means, this increase in speed of dynamo-electric machine 1 may be accomplished by advancing the phase of the potentials impressed on the control members 44 of electric valves 24—27. It is to be noted that at synchronous speed the electrical network 6 and the associated electric valve means will operate to supply a unidirectional current of substantially constant value to the rotor phase windings, thereby eliminating the necessity for auxiliary apparatus to control the speed of the dynamo-electric machine through the zero slip frequency zone which has previously involved considerable difficulty in the control of dynamo-electric machines of the induction type through corresponding speed ranges. By advancing the phase of the potentials impressed on the control members 44 of electric valves 24—27 by means of the angular positioning means 61', the electrical network 6 and these associated electric valves will impress in the rotor circuit including phase windings 3a and 3b an assisting voltage which is in time phase with the voltage induced in these windings by means of the stator winding 2. Since this voltage relation exists, energy will be transmitted from the alternating current circuit 4 to the rotor circuit of machine 1. By advancing the phase of the potentials impressed on the control members 44 of electric valves 24—27, the speed of the dynamo-electric machine may be increased to substantially double synchronous speed.

The operation of the motor system for speeds above synchronous speed may be explained by considering the operating characteristics shown in Fig. 3 where curve A represents the voltage impressed on one of the networks, such as network 6, from one phase of the alternating current circuit 4; curve F represents the voltage impressed on the rotor windings 3a and 3b by electric valves 24, 25 and 36, and curves G, H and I represent the currents conducted by electric valves 36, 24 and 25, respectively. When the motor 1 is operating above synchronous speed, the electric networks 6, 7 and 8 impress assisting voltages on the rotor windings 3a, 3b and 3c. That is, these networks impress voltages which tend to assist the voltages induced in these rotor windings. When the network is operating in this manner, the electric valves 24—41, inclusive, are operating as rectifiers to transmit energy from the alternating current circuit 4 to the rotor phase windings 3a, 3b and 3c. Each of the networks 6, 7 and 8 supplies energy to the associated phase of the rotor circuit of the induction motor 1 during both positive and negative half cycles of rotor voltage. For example, electric valves 24, 25 and 36 of network 6 will supply energy to the rotor windings 3a and 3b during half cycles of one polarity of rotor voltage and electric valves 26, 27 and 37 will supply energy to these rotor windings during half cycles of opposite polarity. Considering the operation of electric valves 24, 25 and 36 during half cycles of rotor voltage of predetermined polarity, when the potential impressed on the control member of electric valve 36 is in substantial phase coincident with the voltage of one phase of the alternating current circuit, as represented by curve A, the voltage impressed on the rotor circuit including windings 3a and 3b will be a maximum and the electric valve 36 will not conduct an appreciable current. However, as the phase of the potential impressed on the control member of electric valve 36 is retarded, for example retarded to a position corresponding to line h, electric valve means 36 will conduct current as illustrated by curve G. At the time h the current will be commutated from the electric valve 36 to electric valve 24, and at the time k the current will be commutated from electric valve 36 to electric valve 25. This transfer of current between the electric valves is effected by virtue of the voltages appearing at these particular times in the winding 12. During the following half cycle of rotor voltage of opposite polarity electric valves 26, 27 and 37 will be placed in operation to effect the desired transfer of energy from the alternating current circuit 4 to rotor phase windings 3a and 3b. The voltages impressed on the rotor windings 3a, 3b and 3c may be controlled by controlling the phase of the potentials impressed on control members 44 of electric valves 24 to 35, inclusive.

By virtue of the electric valves 36 and 37, the power factor of the current supplied by the alternating current circuit 4 to the electrical network 6 has been maintained at a relatively higher value than it would be possible to obtain by virtue of electric valve means 24—27 acting alone, since electric valves 36 and 37 serve to by-pass the current in the rotor circuit which lags the impressed voltage by a predetermined angular value.

It will be noted that by virtue of my invention, it is possible to control the speed of a dynamo-electric machine of the induction type by electric valve means without imposing on the alternating current supply circuit a load having a disproportionately low power factor. Furthermore, inasmuch as the speed of the dynamo-electric machine is controlled from standstill to synchronous speed by controlling only a relatively few of the electric valve means, such as electric valves 36 and 37, arrangements of this nature are particularly desirable from an economic standpoint since the apparatus involved for controlling the electric valve means may be reduced considerably below that previously required in electric valve arrangements for performing similar speed control functions.

As concerns the operation of the electric valve motor control system described above under varying load conditions, let it be assumed that the machine 1 is driving a mechanically connected load of substantially constant magnitude and that the angular positioning means 81 and 81' are adjusted so that the electric valve translating circuit is transmitting energy from the rotor winding to the alternating current circuit 4. If the load is suddenly removed from the machine 1, the speed of the machine will momentarily increase causing thereby an increase in the energy transmitted from the rotor windings to the alternating current circuit 4. This increase in energy transfer will produce a restraining reaction to prevent the speed of the machine 1 from increasing beyond an upper limit established by the commutators 58 to 63, inclusive, and by the inherent regulation characteristics of the networks 6, 7 and 8 and the rotor phase windings 3a, 3b and 3c. The electric motor system described above is essentially a constant speed system neglecting the variations in speed occasioned by the regulation characteristics of the associated apparatus under varying load conditions.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a dynamo-electric machine having an inducing winding connected to be energized from said alternating current circuit and having an induced winding, and electric translating apparatus interposed between said alternating current circuit and said induced winding for controlling an operating condition of said dynamo-electric machine comprising electric valve means for transmitting energy between said alternating current circuit and said induced winding, means for controlling said electric valve means to control said operating condition of said machine and means for independently controlling said electric valve means to control the power factor of the current supplied by said alternating current circuit to said translating apparatus.

2. In combination, an alternating current circuit, a dynamo-electric machine having an inducing winding connected to be energized from said alternating current circuit and having an induced winding, and electric translating apparatus interposed between said alternating current circuit and said induced winding for transmitting energy between said alternating current circuit and said induced winding comprising a network of windings having terminal connections and connections electrically intermediate said terminal connections, electric valve means associated with said terminal connections for transmitting energy between said induced winding and said alternating current circuit and electric valve means associated with said intermediate connections for controlling an operating condition of said dynamo-electric machine.

3. In combination, an alternating current circuit, a dynamo-electric machine having an inducing winding connected to be energized from said alternating current circuit and having an induced winding, and electric translating apparatus interposed between said alternating current circuit and said induced winding for transmitting energy between said alternating current circuit and said induced winding comprising a network of windings having terminal connections and connections electrically intermediate said terminal connections, electric valve means associated with said terminal connections, electric valve means associated with said intermediate connections, means for controlling said first mentioned electric valve means to control an operating condition of said dynamo-electric machine and means for controlling said second mentioned electric valve means to control the power factor of the current supplied by said alternating current circuit to said network.

4. In combination, an alternating current circuit, a dynamo-electric machine having an inducing winding connected to be energized from said alternating current circuit and having an induced winding, and electric translating apparatus interposed between said alternating current circuit and said induced winding for transmitting energy between said alternating current circuit and said induced winding comprising a network of windings having terminal connections and connections electrically intermediate said terminal connections, electric valve means associated with said terminal connections to transmit energy between said alternating current circuit and said induced winding, electric valve means associated with said intermediate connections for controlling the relative voltages of said alternating current circuit and said induced winding and means for independently controlling said first mentioned electric valve means and said second mentioned electric valve means to control the energy transfer between said alternating current circuit and said induced winding.

5. In combination, an alternating current circuit, a dynamo-electric machine of the induction type having an inducing winding connected to be energized from said alternating current circuit and having an induced winding, and electric translating apparatus interposed between said alternating current circuit and said induced winding for transmitting energy between said alternating current circuit and said induced winding comprising an electrical network having a plurality of windings each having terminal connections and connections electrically intermediate said terminal connections, electric valve means associated with said terminal connections for transmitting energy in either direction between said alternating current circuit and said induced winding, electric valve means associated with said intermediate connections for controlling an operating condition of said dynamo-electric machine and means for controlling said first mentioned and said second mentioned electric valve means in accordance with said operating condition of said dynamo-electric machine.

6. In combination, an alternating current circuit, a dynamo-electric machine having an inducing winding connected to be energized from said alternating current circuit and having an induced winding, and electric translating apparatus interposed between said alternating current circuit and said induced winding for transmitting energy between said alternating current circuit and said induced winding comprising a network of windings having terminal connections and connections electrically intermediate said terminal connections, electric valve means associated with said intermediate connections, means for independently controlling said first mentioned electric valve means and said second mentioned electric valve means to control an operating condition of said dynamo-electric machine and means for controlling said second mentioned electric valve means to control the power factor of the current interchange between said alternating current circuit and said network.

7. In combination, an alternating current circuit, a dynamo-electric machine of the induction type having an inducing winding connected to be energized from said alternating current circuit and having an induced winding, electric translating apparatus interposed between said alternating current circuit and said induced winding for controlling said dynamo-electric machine from standstill to double synchronous speed comprising a network of windings having terminal connections and connections electrically intermediate said terminal connections, electric valve means associated with said terminal connections for transmitting energy in either direction between said alternating current circuit and said induced winding, electric valve means associated with said intermediate connections, means for controlling said second mentioned electric valve means to control the speed of said dynamo-electric machine between standstill and synchronous speed and means for controlling said first mentioned electric valve means to control the speed of said dynamo-electric machine between synchronous speed and double synchronous speed.

8. In combination, an alternating current circuit, a dynamo-electric machine of the induction type having an inducing winding connected to be energized from said alternating current circuit and having an induced winding, and electric translating apparatus interposed between said alternating current circuit and said induced winding for transmitting energy between said alternating current circuit and said induced winding comprising a plurality of windings having electrical terminal connections and connections electrically intermediate said terminal connections, electric valve means associated with said terminal connections for transmitting energy in either direction between said alternating current circuit and said induced winding, electric valve means associated with said intermediate connection for controlling the current in the induced winding circuit, means for controlling said second mentioned electric valve means to control the speed of said dynamo-electric machine between standstill and synchronous speed and means for controlling said first mentioned electric valve means to control the speed of said dynamo-electric machine between synchronous speed and double synchronous speed.

9. In combination, an alternating current circuit, a dynamo-electric machine of the induction type having an inducing winding connected to be energized from said alternating current circuit and having an induced winding, electric translating apparatus interposed between said alternating current circuit and said induced winding for controlling an operating condition of said dynamo-electric machine comprising a network of windings having terminal connections and connections electrically intermediate said terminal connections, electric valve means associated with said terminal connections, electric valve means associated with said intermediate connections, means for controlling said first mentioned and said second mentioned electric valve means in accordance with the frequency of the potential of said induced winding to effect transfer of energy between said alternating current circuit and said induced winding, means for controlling said second mentioned electric valve means to control the speed of said dynamo-electric machine from standstill to synchronous speed and means for controlling said first mentioned electric valve means to control the speed of said dynamo-electric machine from synchronous speed to double synchronous speed.

10. In combination, an alternating current circuit, a dynamo-electric machine of the induction type having an inducing winding connected to be energized from said alternating current circuit and having an induced winding, an electrical network connected to said alternating current circuit and having a plurality of windings provided with terminal connections and connections electrically intermediate said terminal connections, electric valve means connected between said terminal connections and said induced winding, electric valve means connected between said intermediate connections and said induced winding, and commutator means for controlling said first mentioned and said second mentioned electric valve means in accordance with the frequency of the potential of said induced winding to transmit energy between said alternating current circuit and said induced winding to control the speed of said dynamo-electric machine from standstill to double synchronous speed.

11. In combination, an alternating current circuit, a dynamo-electric machine of the induction type having an inducing winding connected to be energized from said alternating current circuit and having an induced winding, a network of windings connected to said alternating current circuit and having a plurality of terminal connections and connections electrically intermediate said terminal connections, electric valve means connected between said terminal connections and said induced winding, electric valve means connected between said intermediate connections and said induced windings, a commutator means synchronously driven with respect to the potential of said alternating current circuit for selectively controlling said first mentioned and said second mentioned electric valve means to control the energy transfer between said alternating current circuit and said induced winding to control the speed of said dynamo-electric machine and a second commutator means arranged to be driven at a speed corresponding to the slip frequency of said dynamo-electric machine to modify the effect of said first mentioned commutator means so that energy is transferred between said alternating current circuit and said induced winding in accordance with the slip frequency of said dynamo-electric machine.

12. In combination, an alternating current circuit, a dynamo-electric machine of the induction type having an inducing winding connected to be energized from said alternating current circuit and having an induced winding, an electrical network connected to said alternating current circuit and having a plurality of windings provided with terminal connections and connections electrically intermediate said terminal connections, electric valve means connected between said terminal connections and said induced winding, electric valve means connected between said intermediate connections and said induced winding, and commutator means for controlling said first mentioned and said second mentioned electric valve means in accordance with the frequency of the potential of said induced winding to transmit energy between said alternating current circuit and said induced winding and means for controlling said commutator means to control the speed of said dynamo-electric machine from standstill to double synchronous speed.

BURNICE D. BEDFORD.